United States Patent
Yamauchi et al.

(10) Patent No.: US 7,446,152 B2
(45) Date of Patent: Nov. 4, 2008

(54) METHOD OF PRODUCING HYDROGENATED POLYMERS

(75) Inventors: Tatsuya Yamauchi, Niigata (JP); Yasuhiro Kushida, Niigata (JP); Yuuichi Sugano, Niigata (JP); Yoshikazu Shima, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 205 days.

(21) Appl. No.: 11/374,068

(22) Filed: Mar. 14, 2006

(65) Prior Publication Data

US 2006/0205886 A1    Sep. 14, 2006

(30) Foreign Application Priority Data

Mar. 14, 2005    (JP) .............................. 2005-070581

(51) Int. Cl.
*C08F 8/04*    (2006.01)

(52) U.S. Cl. ...................................... 525/338; 525/339

(58) Field of Classification Search .................. 525/314
See application file for complete search history.

(56) References Cited

U.S. PATENT DOCUMENTS 6,433,102 B1 * 8/2002 Suzuki et al. ............ 525/333.3
6,515,157 B2 * 2/2003 Uh et al. ....................... 556/21

FOREIGN PATENT DOCUMENTS

| EP | 0 317 263 | 5/1989 |
|----|-----------|--------|
| JP | 64-62307  | 3/1989 |
| JP | 3-76706   | 4/1991 |
| JP | 4-75001   | 3/1992 |
| JP | 4-106107  | 4/1992 |
| JP | 5-979163  | 4/1993 |

* cited by examiner

*Primary Examiner*—Randy Gulakowski
*Assistant Examiner*—John M Maksymonko
(74) *Attorney, Agent, or Firm*—Antonelli, Terry, Stout & Kraus, LLP.

(57) ABSTRACT

In the production of a nuclear-hydrogenated polymer, the hydrogenation of an aromatic vinyl compound—(meth)acrylate copolymer is conducted in a mixed solvent comprising an ester compound and an alcohol compound in the presence of a catalyst. By this method, a highly transparent nuclear-hydrogenated polymer is produced safely, stably and quickly, even when the degree of nuclear-hydrogenation is low.

10 Claims, No Drawings

METHOD OF PRODUCING HYDROGENATED POLYMERS

BACKGROUND OF THE INVENTION

1. Field of the Invention

The present invention relates to a method of producing polymers having their aromatic rings hydrogenated (nuclear-hydrogenated), comprising a step of hydrogenating an aromatic vinyl compound—(meth)acrylate copolymer in a mixed solvent of an ester compound and an alcohol compound in the presence of a catalyst.

2. Description of the Prior Art

Non-crystalline plastics such as acrylic resins, methacrylic resins, styrene resins, polycarbonate resins and cyclic polyolefin resins have now been used in various application fields, and particularly have found increasing use as optical materials such as optical lenses and substrates for optical discs because of their excellent optical properties. Such optical materials are required to have, in addition to a high transparency, high functional properties well-balanced in a high heat resistance, a low water absorption and mechanical properties.

Known plastics do not necessarily meet these requirements and involve own problems to be solved. For example, polystyrene is mechanically brittle, large in birefringence and poor in transparency. Polycarbonate is excellent in heat resistance, but has a large birefringence and a transparency as poor as polystyrene. Polymethyl methacrylate is highly transparent, but poor in dimension stability because of extremely high water absorption and low in heat resistance. Polyvinylcyclohexane which is produced by the nuclear hydrogenation of polystyrene is excellent in transparency, but has a low mechanical strength, a poor heat resistance and a poor adhesion to other materials (for example, JP 2003-1308078A, Japanese Patent 3094555, and JP 2004-149549A).

Copolymers of methyl methacrylate (MMA) and styrene (MS resin) are highly transparency and well balanced in dimension stability, rigidity, specific gravity, etc., but exhibit a large birefringence.

Nuclear-hydrogenated MS resins (MSH resins), particularly MSH resins having a MMA unit content of 50 mol % or more exhibit, as compared with MS resins, a birefringence extremely lowered and are known to be well balanced in transparency, heat resistance and mechanical properties.

The nuclear hydrogenation of aromatic polymers are already known. It has been recognized in the art that the degree of nuclear hydrogenation must be increased for attaining a high transparency, and therefore, highly transparent resins cannot be obtained unless the degree of nuclear hydrogenation is increased to about 100%. This is because that the resultant polymer has a block structure when the degree of nuclear hydrogenation is low, to lower the total light transmittance. Aromatic polymers are not easily nuclear-hydrogenated because of their high molecular weights. Therefore, it has been proposed to design the micro pore structure of catalyst (for example, JP 11-504959T). However, it is difficult to reach 100% degree of nuclear hydrogenation. Therefore, it has been demanded to provide a method which is capable of attaining a high transparency even when the degree of nuclear hydrogenation is lower.

The nuclear hydrogenation is largely affected by the solvent because it is a reaction of macromolecules. Various solvents such as hydrocarbons, alcohols, ethers and esters are hitherto used for the nuclear hydrogenation. However, these solvents involve problems: hydrocarbons and alcohols are poor in dissolving power to aromatic polymers; ethers, for example, 1,4-dioxane has a low ignition point; and tetrahydrofuran is instable because it is easily subject to ring-opening reaction; and esters make the resultant polymers cloudy depending on the degree of nuclear hydrogenation. Thus, there has been proposed no safe and stable method capable of quickly producing highly transparent nuclear-hydrogenated aromatic polymers. It has been reported that a high transparency can be attained even at a low degree of nuclear hydrogenation by adding alcohol or water to ether solvents (for example, Japanese Patent 2890748). However, the nuclear-hydrogenated polymer produced by the proposed method fails to satisfy the high transparency required for optical materials.

SUMMARY OF THE INVENTION

The present invention provides a safe and stable method capable of quickly producing highly transparent nuclear-hydrogenated aromatic polymers even when the degree of nuclear hydrogenation is low.

As a result of intensive research, it has been found that highly transparent nuclear-hydrogenated polymers can be quickly, safely and stably produced by hydrogenating aromatic vinyl compound—(meth)acrylate copolymers in the presence of a catalyst in a mixed solvent comprising an ester compound and an alcohol compound, and further found that the obtained nuclear-hydrogenated polymers are highly transparent even when the degree of nuclear hydrogenation is low. The present invention is based on these findings.

Thus, in one aspect, the present invention relates to a method of producing a nuclear-hydrogenated polymer which comprises a step of hydrogenating an aromatic vinyl compound—(meth)acrylate copolymer in a mixed solvent comprising an ester compound and an alcohol compound in the presence of a catalyst. In another aspect, the present invention relates to a composition for optical materials comprising the nuclear-hydrogenated polymer produced by such a method.

DETAILED DESCRIPTION OF THE INVENTION

The present invention will be described below in detail.

Examples of the aromatic vinyl compounds used in the present invention include styrene, α-methylstyrene, hydroxystyrene, alkoxystyrene and chlorostyrene, with styrene being preferred.

Examples of the (meth)acrylates used in the present invention include alkyl (meth)acrylate such as methyl (meth)acrylate, ethyl (meth)acrylate, butyl (meth)acrylate, lauryl (meth)acrylate, stearyl (meth)acrylate, cyclohexyl (meth)acrylate, and isobornyl (meth)acrylate; hydroxyalkyl (meth)acrylate such as 2-hydroxyethyl (meth)acrylate, 2-hydroxypropyl (meth)acrylate, and 2-hydroxy-2-methylpropyl (meth)acrylate; alkoxyalkyl (meth)acrylate such as 2-methoxyethyl (meth)acrylate and 2-ethoxyethyl (meth)acrylate; aralkyl (meth)acrylate such as benzyl (meth)acrylate; aryl (meth)acrylate such as phenyl (meth)acrylate; and (meth)acrylates having a functional group similar to phospholipid such as 2-(meth)acryloyloxyethylphosphorylcholine. In view of the balance in the properties of the resulting hydrogenated polymers, a sole use of an alkyl methacrylate and a combined use of an alkyl methacrylate and an alkyl acrylate are preferred. If used in combination, it is preferred to use 80 to 99.9 mol % of the alkyl methacrylate and 0.1 to 20 mol % of the alkyl acrylate. Of the alkyl acrylates, preferably used are methyl acrylate or ethyl acrylate.

In this application, "acrylate" and "methacrylate" are combinedly expressed as "(meth)acrylate."

A monomer mixture containing the aromatic vinyl compound and the (meth)acrylate is polymerized by a known method, preferably by radical polymerization because of its easiness for industrial use. The radical polymerization is carried out in a known manner selected from bulk polymerization, solution polymerization, emulsion polymerization and suspension polymerization. For example, the bulk polymerization and solution polymerization are continuously carried out at 100 to 180° C. while continuously feeding a monomer composition containing monomers, a chain transfer agent and a polymerization initiator to a complete mixing tank. In the solution polymerization, the monomer composition is fed into a reaction tank together with a hydrocarbon solvent such as toluene, xylene, cyclohexane and methylcyclohexane, an ester solvent such as ethyl acetate, a ketone solvent such as acetone and methyl ethyl ketone, an ether solvent such as tetrahydrofuran and dioxane, or an alcohol solvent such as methanol and isopropanol. After polymerization, the reaction product solution from the polymerization tank is introduced into a volatilizing extruder or a vacuum volatilizing tank for removing volatile components, to obtain an aromatic vinyl compound—(meth)acrylate copolymer.

Generally, the ratio of constitutional units of vinyl copolymers is not necessarily in accord with the ratio of the charged monomers and determined by the amounts of monomers actually incorporated into the copolymer by polymerization. The ratio of constitutional units of copolymer is in accord with the ratio of the charged monomers if 100% of the charged monomers are polymerized. Usually, 50 to 80% of the charged monomer is polymerized in practical productions. In this case, the monomer with a higher reactivity is dominantly incorporated into the polymer, resulting in the disaccord between the ratio of the charged monomers and the ratio of constitutional units of the resultant copolymer. Thus, the ratio of the charged monomers should be regulated so as to obtain a desired ratio of constitutional units of the resultant copolymer.

The molar ratio of the constitutional units ((meth)acrylate monomer units/aromatic vinyl monomer units) of the aromatic vinyl compound—(meth)acrylate copolymer used in the hydrogenation of the invention is preferably from 0.25 to 4. If 0.25 or more, the mechanical strength sufficient for practical use is obtained. If 4 or less, the number of aromatic rings to be hydrogenated is sufficient and the improving effect on properties, for example, the increase in glass transition temperature by hydrogenation, is obtained. In view of balance in properties, the molar ratio is more preferably from 0.25 to 2.5, and still more preferably from 0.25 to 2.

The weight average molecular weight of the aromatic vinyl compound—(meth)acrylate copolymer is preferably from 10,000 to 1,000,000, more preferably from 50,000 to 700,000, and still more preferably from 100,000 to 500,000. Copolymers having a weight average molecular weight of less than 10,000 or more than 1,000,000 can be also nuclear-hydrogenated by the method of the invention. However, within the above range, the copolymer is easy to handle with respect to viscosity, etc., and a nuclear-hydrogenated polymer having mechanical strength sufficient for practical use is obtained. The weight average molecular weight was determined by gel permeation chromatography (GPC). GPC was conducted using THF solvent and the results were calibrated by a standard polystyrene.

In the method of the present invention, the nuclear hydrogenation is conducted in a solvent dissolving the aromatic vinyl compound—(meth)acrylate copolymer. Preferred solvents are those capable of well dissolving hydrogen and the copolymers before and after the nuclear hydrogenation, and having no site susceptible to hydrogenation. The solvent is further required to allow the nuclear hydrogenation to proceed quickly. To facilitate the removal of the solvent after the nuclear hydrogenation, it is important for the solvent to have a high ignition point. As the solvent satisfying all of these requirements, a mixed solvent of an ester compound and an alcohol compound is used in the present invention.

The ester compound is preferably at least one aliphatic ester compound selected from the compounds represented by the following formula 1:

$$R^1COOR^2 \qquad (1)$$

wherein $R^1$ is an alkyl group having from 1 to 6 carbon atoms and $R^2$ is an alkyl group having from 1 to 4 carbon atoms. Examples thereof include methyl acetate, ethyl acetate, n-butyl acetate, pentyl acetate, methyl propionate, ethyl propionate, n-propyl propionate, n-butyl propionate, methyl n-butyrate, methyl isobutyrate, n-butyl n-butyrate, methyl n-valerate, and methyl n-hexanoate, with methyl isobutyrate being preferably used.

The alcohol compound is preferably at least one aliphatic alcohol compound selected from the compounds represented by the following formula 2:

$$R^3CH_2OH \qquad (2)$$

wherein $R^3$ is hydrogen atom or an alkyl group having from 1 to 6 carbon atoms. Examples thereof include methanol, ethanol, n-propanol, isopropanol, and butanol, with methanol and n-propanol being preferably used.

The mixing ratio is preferably from 0.5 to 20 parts by weight, more preferably from 1 to 10 parts by weight of the alcohol compound per 100 parts by weight of the ester compound.

Generally, the nuclear-hydrogenated polymer includes non-hydrogenated aromatic rings which are likely to make the polymer cloudy. This is because on one hand that the nuclear-hydrogenated units and the non-hydrogenated units form respective blocks, and on the other hand that the low molecular chain is preferentially nuclear-hydrogenated and the high molecular chain remains non-hydrogenated. Thus, the rate of nuclear hydrogenation is different in the low molecular chain and the high molecular chain. Therefore, if only the low molecular chain is preferentially nuclear-hydrogenated, domains occur to likely make the resultant polymer cloudy. If the formation of the high molecular non-hydrogenated units is prevented and the whole reaction system is compatibilized, the domains are not formed, thereby obtaining a highly transparent nuclear-hydrogenated polymer. This can be attained by the use of the mixed solvent mentioned above.

The concentration of the aromatic vinyl compound—(meth)acrylate copolymer in the solution for the nuclear hydrogenation is preferably from 1 to 50% by weight, more preferably from 3 to 30% by weight, and still more preferably from 5 to 20% by weight. Within the above range, the reaction speed and the viscosity of solution are moderate and the productivity and production efficiency are good.

The catalyst for the nuclear hydrogenation is selected from known catalysts which cause no hydrogenation and other reactions of the mixed solvent. Examples thereof include solid catalysts composed of a general porous carrier, such as activated carbon, alumina ($Al_2O_3$), silica ($SiO_2$), silica-alumina ($SiO_2$—$Al_2O_3$) and diatomaceous earth, carrying metals such as palladium (Pd), platinum (Pt), rhodium (Rh), ruthenium (Ru) and nickel (Ni), or oxides, salts or complexes of these metals. The amount of metal carried on the carrier is preferably from 0.01 to 50% by weight, more preferably from 0.05 to 20% by weight, and still more preferably from 0.1 to 10% by weight. When the nuclear hydrogenation is conducted in a manner of slurry bed, the particle size of carrier is preferably from 0.1 to 1,000 μm, more preferably from 1 to 500 μm, and still more preferably from 5 to 200 μm. Within the above range, the removal of catalyst after the nuclear hydrogenation is easy and the decrease of reaction speed is prevented. In view of dispersibility of the metal to be carried and ability of hydrogenation, the pore size of the carrier is preferably from 20 to 3,000 Å and the specific surface area thereof is preferably 5 m$^2$/g or more. The catalyst is used preferably in an amount of from 0.1 to 50 parts by weight per 100 parts by weight of the aromatic vinyl compound—(meth) acrylate copolymer.

The nuclear hydrogenation is conducted in either of slurry bed or fixed bed in either of batch manner or continuous flow manner as employed in the art. Preferably, the nuclear hydrogenation is conducted at 60 to 250° C. for 3 to 48 h under a hydrogen pressure of 3 to 30 MPa. An excessively low reaction temperature causes the reaction speed slow, and an excessively high reaction temperature decomposes the copolymer. A low hydrogen pressure makes the reaction speed slow, and a high hydrogen pressure requires a pressure resistant reaction vessel to make the production economy poor.

After the nuclear hydrogenation, the catalyst is removed by a known method such as filtration and centrifugal separation. In view of discoloration and the adverse affect on mechanical properties, the residual amount of catalyst metal in the nuclear-hydrogenated polymer is preferably as low as possible, more preferably 10 ppm or less, and still more preferably 1 ppm or less.

The purified nuclear-hydrogenated polymer is obtained from the polymer solution after the nuclear hydrogenation by removing the solvent, for example, by the following manner: (1) the solvent is continuously removed from the polymer solution and the resultant concentrate is melt-extruded into pellets; (2) the solvent is evaporated from the polymer solution and the resultant mass is pelletized; (3) the polymer solution is poured into or added with a poor solvent and the resultant precipitate is pelletized; and (4) the polymer solution is brought into contact with a hot water and the resultant mass is pelletized.

The nuclear-hydrogenated polymer obtained by the method of the invention is transparent because it transmits visible lights well. The total light transmittance is preferably 90% or more when measured on a molded article with a thickness of 3.2 mm. Since the loss of light due to the reflection at the surface of molded article cannot be avoided, the upper limit of the total light transmittance depends on the refractive index. If used as optical materials, a higher transparency is sometimes required. Therefore, the total light transmittance is more preferably 91% or more and still more preferably 92% or more. Such a high transparency can be attained by a uniform hydrogenation of aromatic rings.

The composition containing the nuclear-hydrogenated polymer produced by the method of the present invention is thermoplastic, and therefore, easily made into precision shaped articles by a thermoforming such as extrusion, injection molding and fabrication of sheets. Since the nuclear-hydrogenated polymer is excellent in optical properties, its shaped articles are used as light guide palate or body, display front panel, plastic lens substrate, optical filter, optical film, illuminant cover, illumination signboard, etc.

The present invention will be described in more detail with reference to the following examples. However, it should be noted that the following examples are merely illustrative and the scope of the present invention is not limited thereto.

The evaluations of the nuclear-hydrogenated polymer were made by the following methods.

(1) Degree of Nuclear Hydrogenation

Expressed by the degree of reduction in the peak at 260 nm before and after the nuclear hydrogenation measured by UV spectroscopy.

(2) Total Light Transmittance

Using an electric injection molding machine (Autoshot-100B manufactured by Fanuc Ltd.), a nuclear hydrogenated polymer was made into molted articles at a cylinder temperature of 260° C. while changing the conditions for metering and maintaining the pressure. After the machine reached a condition for stably producing molded articles without molding shrink, a flat plate (50 mm×50 mm×3.2 mm) was produced at a mold temperature of 90° C. and a cooling time of 40 S. Then the flat plate was measured for its total light transmittance by a transmission method using a color/turbidimeter COH-300A available from Nippon Denshoku Industries Co., Ltd.

EXAMPLE 1

Into a mixed solvent consisting of 42.75 g of methyl isobutyrate (IBM) and 2.25 g of n-propanol, 5 g of MMA-styrene copolymer "MS 600" available from Nippon Steel Chemical Co., Ltd. (weight average molecular weight=170,000; MMA/styrene=6/4 by mole) was dissolved. The obtained solution and 0.1 g of 10 wt % Pd/C (PE Type available from N.E. Chemcat Corporation) were charged in a 200-ml autoclave, and the nuclear hydrogenation was conducted at 200° C. under a hydrogen pressure of 9 MPa for 6 h. After the reaction, the reaction product solution was filtered to remove the catalyst. The filtrate was poured into an excess amount of methanol to precipitate the polymer which was then recovered.

The degree of nuclear hydrogenation was 91.8% and the total light transmittance was 92%.

EXAMPLE 2

In the same manner as in Example 1 except for using 2.25 g of methanol in place of 2.25 g of n-propanol and changing the reaction time to 24 h, the nuclear hydrogenation was conducted to produce the polymer. The degree of nuclear hydrogenation was 93.5% and the total light transmittance was 92%.

EXAMPLE 3

In the same manner as in Example 1 except for using 2.25 g of n-butanol in place of 2.25 g of n-propanol, the nuclear hydrogenation was conducted to produce the polymer. The degree of nuclear hydrogenation was 84.3% and the total light transmittance was 92%.

COMPARATIVE EXAMPLE 1

In the same manner as in Example 1 except for using only 45 g of IBM as the solvent and changing the amount of catalyst to 0.2 g, the nuclear hydrogenation was conducted to produce the polymer. The degree of nuclear hydrogenation was 97.9% and the total light transmittance was 85%.

COMPARATIVE EXAMPLE 2

In the same manner as in Example 1 except for using 2.25 g of cyclohexane in place of 2.25 g of n-propanol, the nuclear hydrogenation was conducted to produce the polymer. The degree of nuclear hydrogenation was 96.0% and the total light transmittance was 84%.

COMPARATIVE EXAMPLE 3

In the same manner as in Example 1 except for using 2.25 g of n-butyl ether in place of 2.25 g of n-propanol, the nuclear hydrogenation was conducted to produce the polymer. The degree of nuclear hydrogenation was 90.8% and the total light transmittance was 85%.

COMPARATIVE EXAMPLE 4

Into 225 g of ethyl acetate, 25 g of MMA-styrene copolymer "MS 600" was dissolved. The obtained solution and 0.5 g of 10 wt % Pd/C (PE Type available from N.E. Chemcat Corporation) were charged in a 500-ml autoclave, and the nuclear hydrogenation was conducted at 200° C. under a hydrogen pressure of 13 MPa for 15 h. After the reaction, the polymer was recovered in the same manner as in Example 1. The degree of nuclear hydrogenation was 94.6% and the total light transmittance was 85%.

COMPARATIVE EXAMPLE 5

Into 90 g of methyl acetate, 10 g of MMA-styrene copolymer "MS 600" was dissolved. The obtained solution and 0.2 g of 10 wt % Pd/C (PE Type available from N.E. Chemcat Corporation) were charged in a 200-ml autoclave, and the nuclear hydrogenation was conducted at 200° C. under a hydrogen pressure of 13 MPa for 15 h. After the reaction, the polymer was recovered in the same manner as in Example 1. The degree of nuclear hydrogenation was 96.4% and the total light transmittance was 84%.

COMPARATIVE EXAMPLE 6

In the same manner as in Example 1 except for using 45 g of n-propanol in place of the mixed solvent, the nuclear hydrogenation was tried to conduct. However, it was difficult to allow the nuclear hydrogenation of the MMA-styrene copolymer to adequately proceed, because the MMA-styrene copolymer was hardly dissolved in n-propanol.

The nuclear-hydrogenated polymer produced by the method of the present invention has a high transparency, a low birefringence, a high heat resistance, a high surface hardness, a low water absorption, a low specific gravity, a high transfer printability, and a high releasability. Because of its properties excellent as optical materials, the nuclear-hydrogenated polymer is widely applied to optical lenses, light guide plates, light diffusers, optical disc substrates, front panels, etc.

What is claimed is:

1. A method of producing a nuclear-hydrogenated polymer which comprises a step of hydrogenating a styrene/methyl methacrylate copolymer in solution in a mixed solvent comprising methyl isobutyrate and an alcohol compound selected from the group consisting of methanol, n-propanol, and n-butanol, wherein the mixed solvent comprises 100 parts by weight of the methyl isobutyrate and 0.5 to 20 parts by weight of the alcohol compound, in the presence of a catalyst.

2. The method according to claim 1, wherein a weight average molecular weight of the styrene/methyl methacrylate copolymer is from 10,000 to 1,000,000.

3. The method according to claim 1, wherein a molar ratio of the constitutional units, methyl methacrylate monomer units/stryrene monomer units, of the styrene/methyl methacrylate copolymer is from 0.25 to 4.

4. The method according to claim 1, wherein the catalyst is selected from the group consisting of palladium, platinum, rhodium, ruthenium, nickel, oxides thereof, salts thereof and complexes thereof.

5. The method according to claim 1, wherein the catalyst is supported on a carrier selected from the group consisting of activated carbon, alumina, silica, silica-alumina and diatomaceous earth.

6. A nuclear-hydrogenated polymer produced by the method according to claim 1.

7. The nuclear-hydrogenated polymer according to claim 6, wherein a total light transmittance is 90% or more when measured on a molded article having a thickness of 3.2 mm.

8. A composition for optical materials comprising the nuclear-hydrogenated polymer according to claim 6.

9. The method according to claim 1, wherein the mixed solvent comprises 100 parts by weight of the ester compound and 1 to 10 parts by weight of the alcohol compound.

10. The method according to claim 1, wherein concentration of the styrene/methyl methacrylate copolymer in solution in the mixed solvent is 1 to 50% by weight.

\* \* \* \* \*